PRINTED CIRCUIT HARDWARE

Filed July 19, 1963 2 Sheets-Sheet 1

INVENTORS.
STANLEY E. BEALE
ROBERT V. FISCHER
BY
Christie, Parker & Hale
ATTORNEYS.

United States Patent Office 3,197,731
Patented July 27, 1965

3,197,731
PRINTED CIRCUIT HARDWARE

Stanley E. Beale, Bradbury, and Robert V. Fischer, Los Angeles, Calif., assignors, by mesne assignments, to Applied Development Corporation, a corporation of California Filed July 19, 1963, Ser. No. 296,337
14 Claims. (Cl. 339—176)

This invention relates to apparatus for filing printed circuit boards or cards and, more particularly, to modular hardware that may be readily snapped together for assembly in a circuit board receptacle and thereby allow circuit boards to be readily placed into and out of circuit relationship therewith.

This invention is an improvement over the modular hardware construction described in Patent No. 3,017,232, granted on January 16, 1962.

The type of modular hardware described in the above identified patent has found extensive usage for filing printed circuit cards in a multiplicity of electronic applications. Modular hardware of this type has been readily accepted due to the flexibility of the hardware which allows the hardware to be utilized in electronic circuit applications that vary considerably from one another since the hardware eliminates complex sheetmetal work, unreliable connector alignments, and involved wiring harnesses. The use of such mass produced modular hardware then minimizes the expense in packaging electronic systems. In view of the fact that the modular hardware has become so popular and has been utilized in so many applications, coupled with the fact that printed circuit cards for these electronic applications have different depths and widths, the number of different parts that have to be stocked in order to readily fill the orders for all these various applications is substantial, on the order of over 600 parts—parts of different sizes and shapes to meet particular requirements. In view of the large number of different parts that are required, the expense of tooling and manufacturing the modular hardware is greater than expected as well as the expense of maintaining a large inventory of different parts.

Experience has also indicated that the design of the modular hardware requires improvement from the standpoint of reducing the amount of material utilized for the hardware as well as the space occupied by the hardware to allow an increase in the density of stored printed circuit cards for a given storage space. These requirements are particularly stringent when the printed circuit cards are scheduled for military or space applications.

The present invention provides improved, light weight, inexpensive modular hardware for use with printed circuit cards and, in particular, for providing a library of printed circuit cards that may be readily stacked in side-by-side relationship in a drawer and wherein the density of printed circuit cards is increased over prior art techniques. The improved modular hardware of the present invention is defined to allow the hardware to be more universally employed so that the standard number of parts that have to be stocked has been substantially reduced whereby approximately 28 different parts need be stocked. The elements of the modular hardware have been defined to be self-supporting and require approximately 10% less material.

From a structural standpoint, the modular hardware comprises a guiding element for slidably receiving a printed circuit card that is of a two piece construction wherein the pieces are defined to be snap-locked together and to a mounting member in a self-supporting relationship. One piece of the guiding element, an elongate element, is defined with a circuit board track extending longitudinally on at least one side thereof and with one end defined to be snap-locked. The second piece of the guiding element is constructed as a mounting foot having an end adapted to be snap-locked to the cooperating end of the elongate element. The mounting foot is provided with an aperture spaced thereon for aligning the track of the guiding element with an electrical connector connected thereto and a similarly defined guiding element so that a circuit board may be slidably received by the thus arranged guiding elements and readily slipped into electrical engagement with the secured electrical connector. The guiding elements are further defined with a mounting socket adjacent each end. The guiding elements are defined with mounting sockets adjacent the ends thereof and are preferably defined to receive a T-bar mounting element to be self-supporting. The snap-locked combination of the elongate element and the mounting foot coact to define the mounting socket on one side thereof. The elongate element and the mounting foot are also characterized wherein their snap-locked combination coact to define a longitudinal track for alignment with the track of the elongated element on the opposite side from the mounting socket.

These and other features of the present invention may be more fully appreciated when considered in the light of the following specification and drawings, in which.

Figure 1:
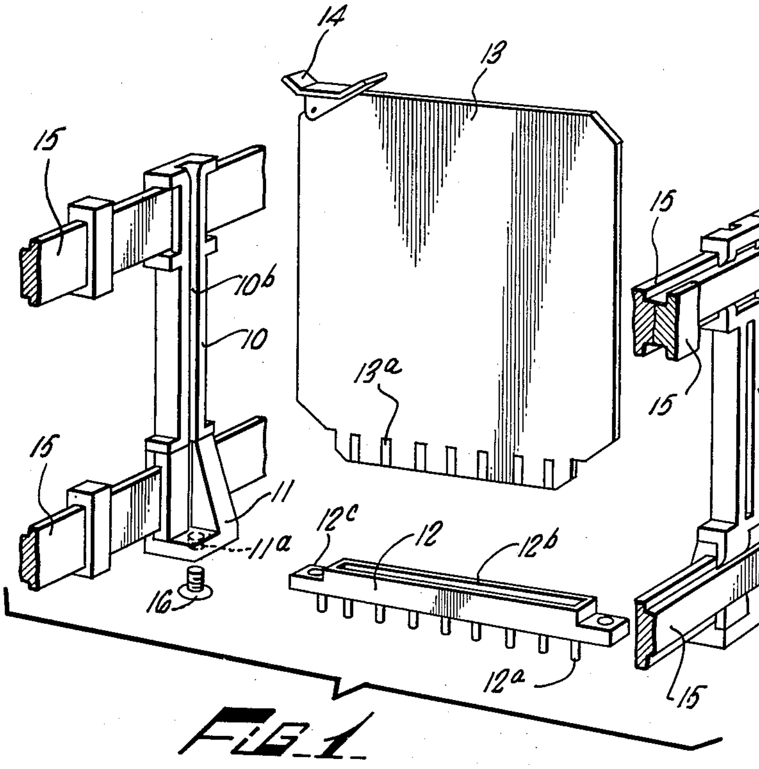
FIG. 1 is an exploded view of the modular hardware embodying the present invention shown in its relationship with a printed circuit card, electrical connector, and mounting element and illustrating the relationship of a pair of guide elements of the modular hardware, partially in dotted outline, for storing circuit boards in a side-by-side relationship.

Now referring to the drawings, the structure for each of the modular elements allowing them to be snap-locked together to form a modular assembly or receptacle for storing and filing printed circuit boards will be described. Basically the modular hardware comprises a guide element 10, a mounting foot 11, and the electrical connector 12 for use with a printed circuit card or board 13. The printed circuit card or board 13 is preferably provided with a card ejection handle 14 mounted adjacent one corner thereof; see FIG. 1. The guide element 10 and the mounting foot 11 are defined to be snap-locked to one another and, in turn, are snap-locked to mounting members, preferably of a T-bar construction, such as the bars 15 illustrated in FIG. 1.

It will be appreciated that the illustration of the printed circuit card 13 has been simplified in that the usual printed circuit pattern and the associated electrical components are not illustrated. The lower edge of the circuit board 13, as shown in FIG. 1, merely includes the portions $13^a$ of the printed circuit pattern that coacts with the electrical connector 12 and arranged in alignment with each of the pins $12^a$ of the connector 12. In this regard, it will also be appreciated that the electrical connector 12 is a conventional, commercially available connector and is defined for the purposes of this invention whereby the printed circuit card 13 is received in the socket portion $12^b$ thereof. In addition, the mounting foot 11 is received and secured to one of the ends of the connector such as the stepped end $12^c$, as will become more evident hereinafter.

The guide elements 10 comprise an elongate element constructed of a resilient plastic, such as nylon, and which elements may be readily formed by means of an injection molding process. The guide elements are preferably constructed to be self-supporting on their mounting members and are provided with socket portions $10^a$ and which socket portions are preferably defined relative to the mounting member whereby they may be snap-locked to the mounting member in a self-supporting relationship. To this end, the mounting member is preferably constructed as a T-bar, defining a T in cross-section. Accordingly, the mounting socket $10^a$ is also constructed for defining a T cross-section, as is evident from an examination of FIG. 2, whereby it may be readily snapped over the T-bar 15 in a gripping fashion to assume the desired self-supporting relationship. A mounting socket $10^a$ is also defined on the opposite end of the guide element 10, as will be described hereinbelow.

The opposite side of the guide element 10 from the side defining the mounting socket $10^a$ is provided with a longitudinal slot or track $10^b$ extending essentially the entire length of the guide element 10. The guiding slot or track $10^b$ is defined of a depth to slidably receive the circuit board 13 along one of its edges and to securely hold it in this position when placed therein. The guiding slot $10^b$ extends from the end of the guide element 10 defining the mounting socket $10^a$ towards the opposite end of the guide element 10 and which end may be better characterized as the snap-locked end $10^c$ of the guide element 10. The track $10^b$ extends to this end of the guide element 10 by means of the track length defined by the combination of the snap-locked end $10^c$ of the guide element 10 and the mounting foot 11.

The mounting foot 11 is adapted to be snap-locked to the end $10^c$ of the guide element 10 and to thereby define not only the extension of the track $10^b$ but also the aforementioned additional mounting socket on the same side of the guide element 10 as the mounting socket $10^a$. The mounting foot 11, as in the prior art construction, is provided with a threaded aperture 11a aligned with the track $10^b$ to cause the electrical connector 12 to be secured in alignment with the track $10^b$. These two pieces may be secured together by means of a fastener such as the screw 16, shown in FIG. 1. This, then, assures that the circuit board 13 that is inserted into the guide element 10 is correctly guided by means of the track $10^b$ to be received in the correctly aligned socket $12^b$ of the electrical connector 12 and thereby into correct electrical engagement therewith.

Figures 2, 4:
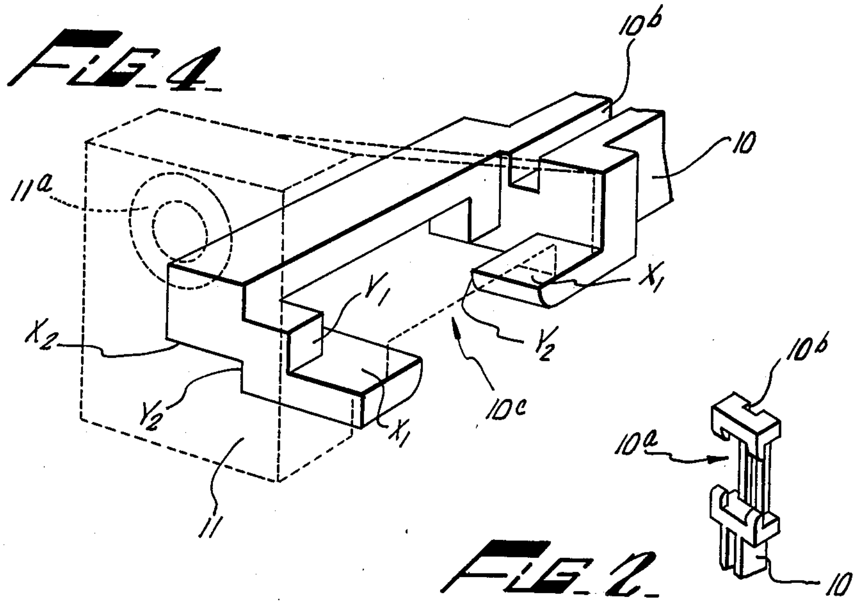
FIG. 2 is a partial perspective view of the guide element of the present invention illustrating the mounting socket thereof.
FIG. 4 is a partial perspective view of the snap-locked end of the guide element showing the mounting foot in dotted outline in a snap-locked relationship therewith.

The construction of the snap-locked ends of the guide elements 10 and the mounting foot 11 is defined not only to be snap-locked together but also to maintain the guide element 10 in a rigid alignment in three planes. In particular it should be noted that the mounting foot 11 and the end $10^c$ of the guide element 10 are defined in a stepped complementary fashion wherein each of the blocks comprising the steps of these elements is identical in shape. The complementary relationship allowing these pieces to be snap-locked together results through the orientation of one of the elements with respect to the other through an angle of 180° degrees, as best illustrated in FIG. 4.

An important aspect of the construction of the snap-locked combination is that they are defined with regard to the mounting member and, in particular, to the T-bars 15 whereby the combination of the T-bar 15, the mounting foot 11, and the end $10^c$ of the guide element 10 are locked together by means of the T-bar 15 to maintain them in rigid alignment in the three planes. Specifically, the T-bar 15 acts as a key to prevent the snap-locked pieces from being pulled apart. Although the construction per se of the end $10^c$ of the guide element 10 and the mounting foot 11 results in providing rigidity in two of the planes, namely the planes X and Y, it requires the addition of the T-bar 15 to maintain these elements in rigid alignment with regard to the Z plane. The three planes are identified relative to the mounting foot 11 in FIG. 3. It should be recognized that this construction results in a more positive clamping action to the mounting bar 15. Furthermore, it should be evident that the invention is not restricted to the use of a T-bar configuration as a mounting element since the snap-locked ends are defined relative to the shape of the mounting bar whereby the mounting bar functions as a locking element for securing the snap-locked ends together.

Figures 3, 6:
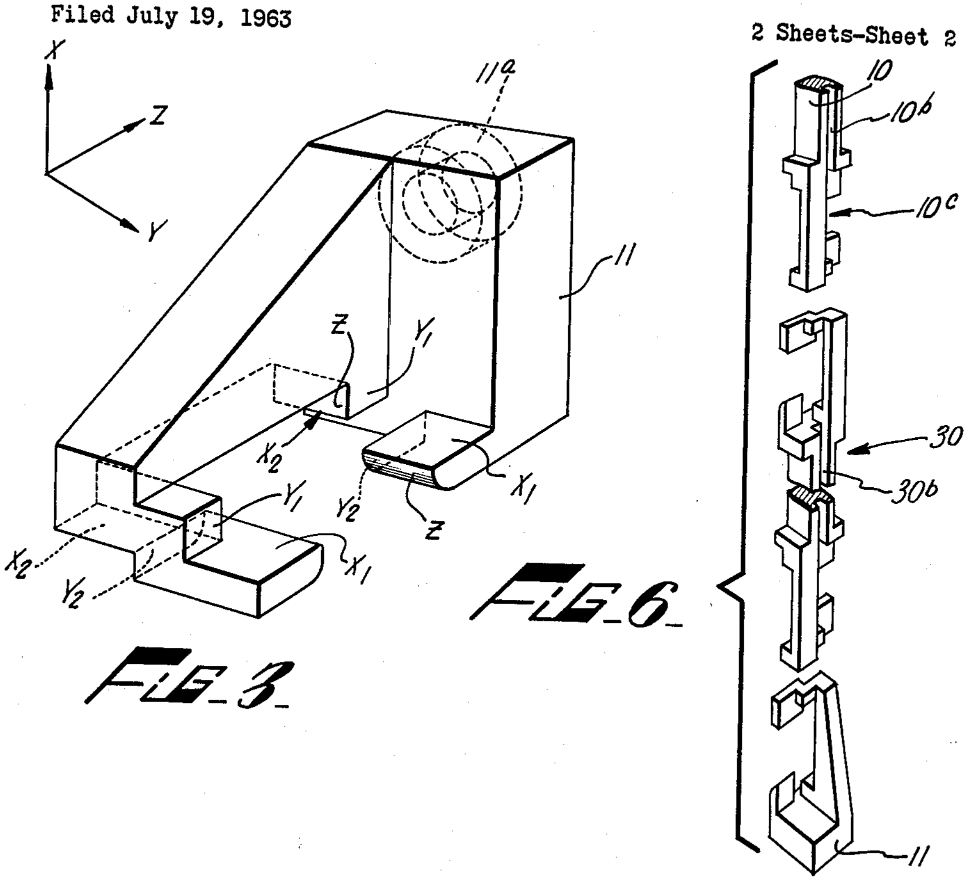
FIG. 3 is a perspective view of the mounting foot for the guide element of FIGS. 1 and 2.
FIG. 6 is an exploded view of a modified guide element.

Referring to FIG. 3 in particular, wherein the three planes are identified with regard to the surface of the mounting foot 11 that coact to maintain the guide element 10 in alignment in a particular plane. To this end, the two step surfaces identified by the reference letters $X_1$ are arranged in the same plane to maintain the corresponding surfaces of the guide element 10 in alignment in the X plane. In the same fashion, the surfaces identified by the reference letters $X_2$ also maintain the snap-locked combination in alignment in the X plane. The surfaces identified by the reference characters $Y_1$ and $Y_2$ maintain the snap-locked combination of surfaces in alignment in the Y plane. The planes identified by the reference letter Z coact with the T-bar 15 to maintain the alignment along the Z plane.

Now referring to FIG. 4 wherein the snap-locked end $10^c$ of the guide element 10 is illustrated, it will be immediately seen that the construction of the blocks or steps is identical to the construction immediately described hereinabove for the mounting foot 11. Accordingly, the corresponding surfaces identified by the reference letters X, Y, and Z in FIG. 3 have been similarly identified in FIG. 4 to better show the identical relationship of these two pieces. To this same end, the mounting foot 11 is superimposed in dotted outline on the guide element end $10^c$ and oriented with respect to this end to place these cooperating surfaces in a complementary relationship to assume the desired snap-locked arrangement. As mentioned hereinabove then, when these two pieces are snap-locked together, an extension of the longitudinal track $10^b$ will be defined and also the opposite side thereof will define a mounting socket similar to the mounting socket $10^a$ at the opposite end for mounting to a T-bar 15 in the desired self-supporting relationship. These aspects of the guide element 10 are best appreciated from an examination of FIG. 1.

Figure 5:
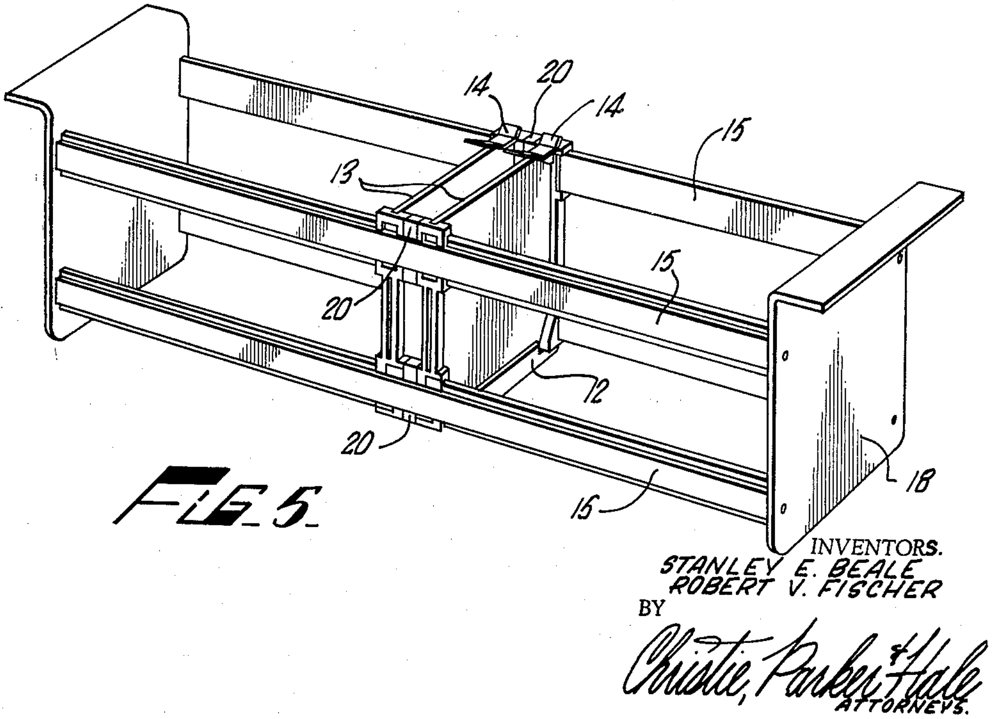
FIG. 5 is a perspective view of a portion of a modular sub-assembly employing the modular elements of FIG. 1 as they may be mounted in a circuit card file.

When the guide element 10 and the mounting foot 11 are snap-locked together and the snap-locked combination is secured to the mounting members 15, the electrical connector 12 may be secured thereto to place the socket portion $12^b$ thereof in alignment with the guide tracks 10 to allow the circuit board 13 to be readily inserted therein. Such an arrangement is shown in FIG. 5 wherein the T-bars 15 are shown secured to mounting plates 18 and with the printed circuit cards 13 shown in electrical engagement with the electrical connector 12. The guide elements 10 are illustrated in a spaced apart relationship by means of spacers 20 snau-locked to the T-bars 15. This combination, then, may be readily inserted into a drawer for storage purposes.

Another important aspect of the present invention is that when a plurality of rows of printed circuit cards are being stored, namely a plurality of rows as shown in FIG. 5, the guide elements 10 may be mounted in a side-by-side relationship independently of the location of the guide elements 10 in the adjacent rows. To this end, when the mounting members are constructed to define a T cross-section, a pair of such T-bar mounting elements 15 may be mounted adjacent one another to thereby form an I-beam cross-section, as best shown in FIG. 1. To this end, the guide element 10′ for the adjacent row may be snap-locked to its T-bar 15 without reference to the adjacent guide element 10 for the adjacent row of printed circuit cards. This has particular significance with regard to the construction of the modular hardware of the type described in the above-identified patent wherein the guide elements 10 are mounted to the same mounting element and, therefore, must be located relative to one another.

Referring to FIG. 6 wherein is illustrated a means for extending the length of the guide elements 10 by snap-locking an extension member 30 thereto. The extension member 30 is defined with a longitudinal track 30$^b$ on one side thereof for alignment with the track 10$^b$ of the guide element 10 proper when it is snap-locked thereto to thereby form an extension of the track 10$^b$. To this end, the snap-locked end 10$^c$ of the guide element 10 receives the end of the extension member 30 which is defined and oriented to be snap-locked thereto in the same fashion as the mounting foot 11. The opposite end of the extension member 30 is defined identically to the end 10$^c$ of the guide element 10 to receive the mounting foot 11. It will therefore be appreciated that the extension member 30 is snap-locked between the mounting foot 11 and the end 10$^c$ of the guide element 10 to accept printed circuit cards of an extended length from those shown in FIG. 1.

What is claimed is:

1. A circuit board guide element comprising an elongate element having a mounting socket defined adjacent an end and adapted to receive a mounting member, said elongate element being further characterized as having a circuit board track defined on at least one side of the element to extend longitudinally thereof to slidably receive and secure the edge of a circuit board, the end of the elongate element opposite the end having the mounting socket being constructed and defined to be snap-locked, and a separate mounting foot having an end constructed and defined to be snap-locked to said end of the elongate element, said mounting foot being provided with an aperture spaced in parallel alignment with the track of the elongate element for securing an electrical connector to said mounting foot by means of the aperture to maintain the elongate element and a secured electrical connector in the same plane when the foot and elongate element are snap-locked together so that a circuit board may be slidably received by the guide element and slipped into engagement with a secured and thus aligned electrical connector said mounting foot being further defined with a longitudinal track for parallel alignment with the track of the elongate element when the foot and the elongate element are snap-locked together.

2. A circuit board guide element as defined in claim 1 wherein the snap-locked combination of the foot and elongate element define an additional mounting socket.

3. A circuit board guide element comprising an elongate element having a mounting socket defined adjacent an end and adapted to receive a mounting member, said elongate element being further characterized as having a circuit board track defined on at least one side of the element to extend longitudinally thereof to slidably receive and secure the edge of a circuit board, the end of the elongate element opposite the end having the mounting socket being defined to be snap-locked, and a separate mounting foot having an end constructed and defined to be snap-locked to said end of the elongate element, said mounting foot being provided with an aperture spaced in parallel alignment with the track of the elongate element for securing an electrical connector to said mounting foot by means of the aperture to maintain the elongate element and a secured electrical connector in the same plane when the foot and elongate element are snap-locked together so that a circuit board may be slidably received by the elongate element and slipped into engagement with a secured electrical connector, and a mounting bar, the snap-locked ends of the foot and elongate element being shaped to define a mounting socket for accepting the mounting bar whereby the mounting bar functions as a locking element when the snap-locked pieces are mounted thereto thereby preventing said pieces from being pulled apart.

4. A circuit board guide element as defined in claim 3 where in the mounting sockets are defined to be snap-locked to a T-bar mounting member.

5. A circuit board guide element comprising an elongate element having a mounting socket defined adjacent an end and adapted to receive a mounting member, said elongate element being further characterized as having a circuit board track defined on at least one side of the element to extend longitudinally thereof to slidably receive and secure the edge of a circuit board, the end of the elongate element opposite the end having the mounting socket being defined to be snap-locked, and a separate mounting foot having an end adapted to be snap-locked to said end of the elongate element, said mounting foot being provided with an aperture spaced in parallel alignment with the track of the elongate element for securing an electrical connector to said mounting foot by means of the aperture to maintain the elongate element and a secured electrical connector in the same plane when the foot and elongate element are snap-locked together, the snap-locked ends of the elongate element and the foot each being shaped in terms of stepped blocks and with one of said ends being oriented with respect to the other of said ends to allow the ends to be slipped into a snap-locked relationship to maintain the elongate element in alignment in three planes.

6. A circuit board guide element comprising an elongate element having a mounting socket defined adjacent an end and adapted to receive a mounting member, said elongate element being further characterized as having a circuit board track defined on at least one side of the element to extend longitudinally thereof to slidably receive and secure the edge of a circuit board, the end of the elongate element opposite the end having the mounting socket being defined to be snap-locked, and a separate mounting foot having an end adapted to be snap-locked to said end of the elongate element, the combination of the mounting foot and the elongate element defining a longitudinal track aligned with the track of the elongate element when the foot and elongate element are snap-locked together, said mounting foot being further provided with an aperture spaced in parallel alignment with the track of the elongate element for maintaining the elongate element and a secured electrical connector in the same plane when the foot and elongate element are snap-locked together so that a circuit board may be slidably received by the guide element and slipped into engagement with a secured electrical connector, the opposite sides of the foot and elongate element from the side defining the circuit board track coacting to define an additional mounting socket when the pair are snap-locked to one another.

7. Modular hardware for mounting circuit boards and the like comprising a pair of circuit board guiding elements, each element having a mounting socket defined adjacent an end and adapted to receive a mounting member, said guiding elements being further characterized as each having a circuit board track defined on at least one side of the element to extend longitudinally thereof to slidably receive and secure the edge of a circuit board, each of the ends of the guiding elements opposite the ends having the mounting sockets being constructed and defined to be snap-locked, and a separate mounting foot for each of the guiding elements having an end constructed and defined to be snap-locked to said end of the guiding element, each mounting foot being provided with an aperture spaced in parallel alignment relative to the tracks of their respective guiding elements for securing an electrical connector to said mounting foot by means of the aperture to maintain the elongate element and a secured electrical connector in the same plane when the feet and guiding elements are snap-locked together, and an electrical connector secured at opposite ends to the feet by means of the aperture thereon with the tracks of the guiding elements opening toward each other to slidably receive and retain a circuit board inserted therein and thereby into electrical engagement with the aligned connector.

8. Modular hardware for mounting circuit boards and the like as defined in claim 7, wherein each snap-locked combination of guide element and mounting foot define an additional mounting socket whereby the guide elements may be mounted and clamped to a suitable mounting member in a self-supporting relationship.

9. Hardware for mounting circuit boards and the like comprising a pair of T-bar mounting elements arranged in substantially the same plane and spaced apart a distance corresponding to a preselected dimension of a circuit board, another pair of T-bar mounting elements arranged in a spaced apart relationship in substantially the same plane and spaced from said first mentioned pair a distance corresponding to another preselected dimension of the circuit board, a pair of circuit board guiding elements mounted on and longitudinally extending between a preselected pair of mounting elements, each of said guiding elements having a mounting socket defined adjacent the opposite ends thereof and adapted to be received and clamped to the T-bar mounting elements in a self-supporting relationship, said guiding elements each being further characterized as having a circuit board track defined on at least one side of the element to extend longitudinally thereof to slidably receive and secure the edge of a circuit board, said guiding elements being aligned in the same plane on said mounting elements and arranged with the tracks facing each other to slidably receive the corresponding edges of a circuit board, the ends of the guiding elements opposite the end having the mounting socket being defined to be snap-locked, and a separate mounting foot for each guide element having an end adapted to be snap-locked to said ends of the guide elements, each of said mounting feet being provided with an aperture spaced thereon for aligning the track of the guiding elements with an electrical connector to be secured thereto when a foot and guide element are snap-locked together, each of the snap-locked combination of guide elements and mounting feet defining a mounting socket on one side thereof to be received and clamped to the T-bar mounting elements and an extension of the longitudinal track of the guiding elements on the opposite side thereof, and an electrical connector secured to a foot of each guiding element and aligned therewith by means of the aperture thereon to slidably receive and retain a circuit board inserted therein from the opposite ends of the guiding elements.

10. Hardware for mounting circuit boards and the like as defined in claim 9 wherein the T-bars function to lock the snap-locked ends together to maintain the elements in rigid alignment in three planes.

11. A circuit board guide element for mounting circuit boards and the like comprising an elongate element having a circuit board track defined on at least one side of the element to extend longitudinally thereof for slidably receiving and securing the edge of a circuit board, one end of the elongate element being constructed and defined to be snap-locked, and a separate mounting foot having an end constructed and defined to be snap-locked to said end of the elongate element, said mounting foot being provided with an aperture the centerline of which is in parallel alignment with the track of the elongate element for securing an electrical connector to said mounting foot by means of the aperture to maintain the elongate element and the secured electrical connector in the same plane when the foot and the elongate element are snap-locked together, and a second similarly defined elongate element adapted to be connected to the other end of the electrical connector to thereby maintain the two edges of a circuit board in the same plane when a circuit board is slidably received between the elongate elements to allow the connector to slidably receive and retain the circuit board to thereby correctly align the corresponding portions of the printed circuit board and the electrical contacts of the connector.

12. A circuit board guide element for mounting circuit boards and the like comprising a pair of circuit board guiding elements having a circuit board track defined on at least one side of each element to extend longitudinally thereof for slidably receiving and securing the edge of a circuit board, one end of each guide element being constructed and defined to be snap-locked, and a pair of separate mounting feet each having an end constructed and defined to be snap-locked to said end of the guide elements, said mounting feet being provided with an aperture spaced in parallel alignment with the track of the guide element for securing an electrical connector to said mounting feet by means of the apertures to maintain the guide elements and the secured electrical connector in the same plane when the mounting feet of the corresponding guide element are snap-locked together, an electrical connector for each of said pairs of guiding elements, means for securing the electrical connector to said mounting feet by means of the aperture thereon thereby aligning the connector in the same plane with the tracks of the guilding elements and maintaining the two edges of a circuit board and the connector in the same plane to allow the connector to slidably receive and retain a circuit board inserted therein from the opposite end of the guiding elements for correctly aligning the corresponding portions of the printed circuit of the circuit board and the electrical contacts of the connector.

13. A circuit board guide element for mounting circuit boards and the like comprising a pair of circuit board guiding elements having a circuit board track defined on at least one side of each element to extend longitudinally thereof for slidably receiving and securing the edge of a circuit board, one end of each guide element being constructed and defined to be snap-locked, and a pair of separate mounting feet each having an end constructed and defined to be snap-locked to said end of the guide elements, said mounting feet being provided with an aperture spaced in parallel alignment with the track of the guide element for securing an electrical connector to said mounting feet by means of the apertures to maintain the guide elements and the secured electrical connector in the same plane when the mounting feet and the corresponding guide element are snap-locked together, an electrical connector for each of said pairs of guiding elements, means for securing the electrical connector to said mounting by means of the aperture thereon thereby aligning the connector in the same plane with the tracks of the guiding elements and maintaining the two edges of a circuit board and the connector in the same plane to allow the connector to slidably receive and retain a circuit board inserted therein from the opposite end of the guiding elements to thereby correctly align the corresponding portions of the printed circuit of the circuit board and the electrical contacts of the connector, and means for mounting said guiding elements in a position to slidably receive a circuit board.

14. An arrangement for snap-locking a pair of members together comprising a pair of members each constructed with an end having a plurality of identical locking surfaces defined in different planes for interlocking the surfaces of one member with the other member, the members being interlocked together when said end of one of the members is oriented 180 degrees with respect to said end of the other member to thereby allow the surfaces defined in different planes on each member to be slidably positioned in matching engagement with one another to assume a locked relationship, and a key member, said pair of members having their locking surfaces further defined relative to the key member to be locked on said key member whereby the three locked members are maintained in rigid alignment.

References Cited by the Examiner

UNITED STATES PATENTS

| | | | |
|---|---|---|---|
| 2,063,895 | 12/36 | Mack | 46—29 X |
| 2,326,029 | 8/43 | Grunt | 312—302 X |
| 2,662,335 | 12/53 | Calverley | 46—29 X |
| 2,731,609 | 1/56 | Sobell | 339—17 |
| 2,951,185 | 8/60 | Buck | 339—17 X |
| 2,994,056 | 7/61 | Fox | 339—65 X |
| 3,008,113 | 11/61 | Johnson | 339—65 X |
| 3,016,148 | 1/62 | Riddle | 211—41 |
| 3,017,232 | 1/62 | Schwab | 312—223 |

FOREIGN PATENTS

| | | |
|---|---|---|
| 863,996 | 3/61 | Great Britain. |

FRANK B. SHERRY, *Primary Examiner.*

CHANCELLOR E. HARRIS, *Examiner.*

UNITED STATES PATENT OFFICE

CERTIFICATE OF CORRECTION

Patent No. 3,197,731 July 27, 1965

Stanley E. Beale et al.

It is hereby certified that error appears in the above numbered patent requiring correction and that the said Letters Patent should read as corrected below.

Column 4, line 60, for "snau-locked" read -- snap-locked --; column 8, line 20, for "mounting feet of the" read -- mounting feet and the --; line 26, for "guilding" read -- guiding --; same column 8, line 52, for "said mounting by means" read -- said mounting feet by means --.

Signed and sealed this 18th day of January 1966.

(SEAL)
Attest:

ERNEST W. SWIDER
Attesting Officer

EDWARD J. BRENNER
Commissioner of Patents